Patented Mar. 11, 1930

1,749,836

UNITED STATES PATENT OFFICE

WILHELM NEELMEIER, OF LEVERKUSEN, AND WINFRID HENTRICH, OF WIESDORF, NEAR COLOGNE-ON-THE-RHINE, GERMANY, ASSIGNORS TO GENERAL ANILINE WORKS, INC., OF NEW YORK, N. Y., A CORPORATION OF DELAWARE

AZO DYESTUFFS DERIVED FROM AMINO-ACYLAMINO-SALICYL-DIPHENYLSULPHONES

No Drawing. Application filed November 5, 1926, Serial No. 146,558, and in Germany January 13, 1925.

We have shown in our co-pending application Serial No. 80,069, filed January 8, 1926, that very valuable mordant dyestuffs are obtained when one uses in their production diazo-compounds obtained from such amino derivatives of diphenylsulphones,

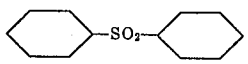

their homologues or substitution products, as contain a hydroxyl and a carboxyl group, in ortho position to each other, in the nucleus which does not contain the amino group.

We have now found that similar, improved dyestuffs are obtained when the above described diphenylsulphone compounds contain in addition, in the nucleus containing the amino group, a second amino group which might be further acidylated, that is to say, one of the hydrogens of the amino group replaced by an acidyl radicle. The general formula of these diphenylsulphone compounds can be represented as follows:

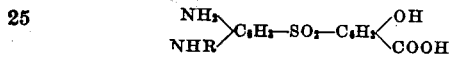

in which R stands for hydrogen or an acidyl group and the hydroxyl and carboxyl groups stand in ortho position to each other; for the sake of convenience these sulphones might be called diaminophenyl-salicyl sulphones.

The process of producing our novel dyestuffs comprises diazotizing a diaminophenyl-salicyl sulphone, coupling the so obtained diazo compound with any desired coupling compound and eventually splitting off the acidyl group. Their general constitution can be represented by the formula:

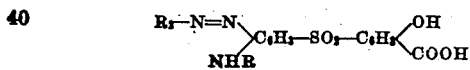

in which R stands again for hydrogen or an acidyl group, $R_2$ stands for a residue of a coupling compound, and the hydroxyl and carboxyl groups stand in ortho position to each other.

As coupling compounds there may be used any of the well known azo-dyestuff coupling components, but we have found that very valuable dyestuffs are obtained by the use as coupling compounds of amino-naphthalene sulphonic acids or amino-naphthol sulphonic acids. The dyestuffs so prepared dye chrome mordanted wool red to violet shades. The same shades are obtained when wool dyed with the said dyestuffs is subjected to an after-chroming treatment. The dyestuffs also are suitable for use in cotton printing, especially since they are very fast to soaping and to fulling. Due to the external position of the group producing the mordanting properties, these dyestuffs possess the additional advantage that their dyeings with chroming vary in shade little if at all from the direct dyeings.

Our invention is illustrated by the following examples, the parts being by weight.

*Example 1.*—350 parts 2-amino-5-acetylamino-4'-hydroxydiphenylsulphone-3'-carboxylic acid (obtained by condensing 1 molecular proportion quinone-di-imine with 1 molecular proportion salicylsulfinic acid and acetylating one only of the two amino groups of the 2-5-diamino-4'-hydroxydiphenylsulphone-3'-carboxylic acid obtained primarily) are dissolved at about 40° C. in the requisite amount of aqueous ammonia. 69 parts sodium nitrite are added to the so obtained solution: it is cooled to about 5° C. and excess 20% hydrochloric acid added, the yellowish diazo-compound separates. This is combined at about 5° C. with a neutral aqueous solution of 259 parts 2-methylaminonaphthalene-7-sulphonate of sodium. The coupling proceeds rapidly, the mineral acidity is neutralized by the addition of sodium acetate and the finished dyestuff is salted out and isolated in the usual manner. After-chromed dyeings of the resulting dyestuff on wool are found to have a beautiful red shade of excellent fastness to light, washing and fulling. The dyestuff is easily precipitated on a substratum and can be used to advantage as lake, distemper or printing color, producing clear, fast red shades. It has, as the free acid, most probably the constitution:

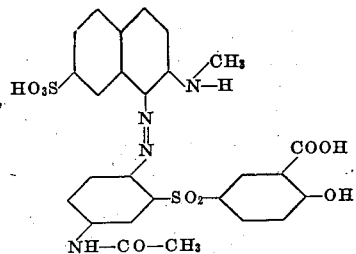

In coupling in acid solution diazotized 2-amino-5-acetylamino-4'-hydroxy-diphenyl-sulphone-3'-carboxylic acid with 2-amino-8-naphthol-6-sulfonic acid a product of the probable constitution

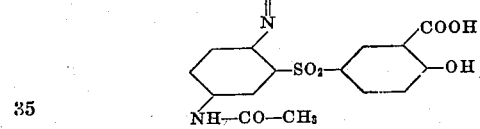

is obtained. After-chromed dyeings obtained therefrom possess a clear, very bluish red shade.

The dyestuff of the following formula:

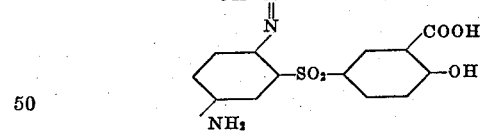

is obtained by splitting off the acetyl group from the above-described dyestuff. Wool dyed with this dyestuff and afterwards subjected to after-chroming shows a violet coloration.

Substitution of a benzoyl or a phthaloyl group for the acetyl group in the above dyestuffs produces still more bluish dyeings. Similar shades are also obtained by using as first component the diazo compound obtained from 2-amino-5-acetylamino-4-methoxy-4'-hydroxy-diphenylsulphone-3'-carboxylic acid.

We claim:

1. As new products the mordant dyestuffs of the general formula:

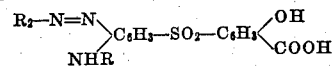

in which R stands for hydrogen or an acidyl group, $R_2$ stands for a residue of a coupling compound, and the hydroxyl and carboxyl groups stand in ortho position to each other.

2. As new products the mordant dyestuffs of the formula

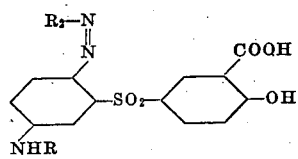

in which $R_2$ stands for a residue of a coupling compound of the naphthalene series and R stands for an acidyl group.

3. As a new product the mordant dyestuff which in the form of its free acid has the formula

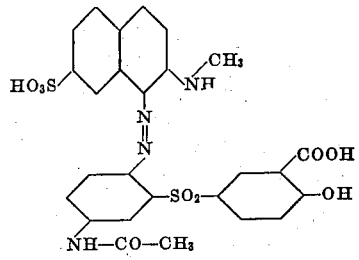

which dyes wool after chromed beautiful red shades of excellent fastness to light, washing and fulling.

4. As new products the mordant dyestuffs of the general formula:

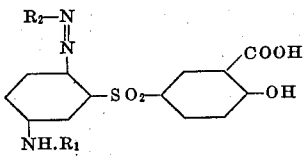

wherein $R_1$ stands for an acidyl group and $R_2$ for the residue of a naphthalene sulphonic acid compound being substituted in at least one ortho-position to the azo group by an amino group which may be substituted.

In testimony whereof, we affix our signatures.

WILHELM NEELMEIER.
WINFRID HENTRICH.